United States Patent [19]

Kostelnicek

[11] 3,810,083
[45] May 7, 1974

[54] SELF-RIGHTING GEOPHONE
[75] Inventor: Richard J. Kostelnicek, Houston, Tex.
[73] Assignee: Esso Production Research Corporation, Houston, Tex.
[22] Filed: July 20, 1972
[21] Appl. No.: 273,651

[52] U.S. Cl.................. 340/8 LF, 310/97, 340/10, 340/17
[51] Int. Cl. .......................................... H04b 13/00
[58] Field of Search ............ 340/10, 8, 9, 8 LF, 12, 340/13, 17; 310/9.7

[56] References Cited
UNITED STATES PATENTS

| | | | |
|---|---|---|---|
| 2,626,992 | 1/1953 | Holman | 340/10 X |
| 3,332,057 | 7/1967 | Pavey, Jr. | 340/17 |
| 3,353,150 | 11/1967 | Jacox | 340/17 X |
| 3,290,645 | 12/1966 | Pavey, Jr. et al. | 340/17 X |
| 3,376,948 | 4/1968 | Morrow | 340/17 X |
| 2,650,991 | 9/1953 | Ketchledge | 310/9.7 X |
| 2,864,073 | 12/1958 | Harris | 340/17 |
| 2,503,831 | 4/1950 | Mason | 310/9.7 X |

*Primary Examiner*—Samuel Feinberg
*Assistant Examiner*—H. J. Tudor
*Attorney, Agent, or Firm*—John B. Davidson

[57] ABSTRACT

Disclosed is a seismic surface cable detector system where the detector comprises axially aligned, tubular, piezoelectric elements having outer metallic coatings and the elements are radially polarized in opposite senses. Electrically nonconductive end walls on the elements define enclosed chambers and at the ends of the chambers are stainless steel electrodes. Mercury is placed in the chambers in an amount less than one-half of the volume of a chamber and provides a reaction mass and an electrical path between the piezoelectric material and the electrode plate. Take out leads are attached to the electrode plates. An open celled foam in the chambers prevents or inhibits splash. The mercury is injected into the chamber by a hypodermic needle which passes through a self-sealing silastic closure.

11 Claims, 4 Drawing Figures

PATENTED MAY 7 1974  3,810,083

SELF-RIGHTING GEOPHONE

BACKGROUND OF THE INVENTION

This invention relates to accelerometers or vibration sensitive devices, and more particularly, to devices for sensing the vertical velocity of ground motion and which are operable at low temperatures and provide a balanced electrical output representative of the vertical component of ground motion.

Transducer assemblies for sensing seismic vibrations and for producing corresponding electrical signals are sometimes called seismometers, detectors, geophones or the like. In seismic prospecting; the types of transducers most often used are the dynamic "moving coil" geophone for surface prospecting and the pressure sensitive piezoelectric hydrophone for marine or underwater prospecting. An advanced type of "moving coil" geophone is illustrated in U.S. Pat. No. 3,054,085 where the construction permits self-orienting or alignment of a moving coil to detect only vertical motion components. In this type of device there is a reaction mass suspended relative to a casing so that ground motion produces a relative motion between the casing and reaction mass. An electromagnetic circuit is responsive to the relative motion between the casing and reaction mass in the geophone for producing electrical signals representative of the vertical component of the ground motion. With a piezoelectric hydrophone, a tubular cylindrical element has electrodes on the inner and outer wall surfaces. In a liquid medium, pressure acting on the wall surface of a piezoelectric element produces a change or distortion in the wall thickness and electrical signals are generated in response to the distortion.

As might be surmised, "moving coil" or mechanically operated detectors require stationary ground contact and their sensitivity is such that they cannot obtain reliable directional measurements while they are in motion. Additionally, they are subject to malfunctions if they are not handled with due care. In short, there is a "handling" problem associated with mechanical detectors. Piezoelectric devices, when incorporated into tow cables, are typically horizontally oriented but omnidirectionally sensitive to pressure waves in a liquid medium. The simplicity of their construction in not having any moving parts is such that there is little possibility of malfunctions due to "handling."

From the foregoing brief analysis, it will be appreciated that it is desirable to obtain a detector for a surface seismic cable which has greater ruggedness so that the cable can be handled without undue care. At the same time, the detector should be capable of being incorporated into the cable and capable of detecting only vertical velocity components and discriminating against components of ground motion other than the vertical. Also the detector should be capable of self orientation, that is, capable of detecting vertical motion in a number of positions other than a normal, orientated position.

SUMMARY OF THE INVENTION

In addition to providing the above mentioned desirable features, the present invention provides a transducer or surface seismic detector which can be operated at extremely low temperatures. The detector comprises two axially aligned, piezoelectric cylinders with end walls which provide hermetically sealed chambers and each chamber respectively contains a heavy, electrically conductive liquid, preferably mercury. The amount of liquid in the chambers is less than one half of the respective volumes and at each of the opposite and outer end walls of the chambers is an internal, circular electrode plate. Each piezoelectric cylinder is poled in a radial mode and adjacent cylinders are poled in opposite senses. By connecting the outer plating or coating of each cylinder to one another and taking an electrical output from the electrode plate on each end wall, the output is electrically balanced. The mercury or other liquid within each cylinder serves as an electrical conductor and reaction mass. For anti-splash purposes, the interior of each cylinder is filled with porous, cellular material.

By dissolving lead or tin in the mercury to form an amalgam, the freezing point of the liquid can be lowered to −40° F. By proportioning the length, diameters, end plate and mount of mercury or other liquid, the unit can be electrically disabled at any selected degree of inclination.

The detector may be disposed within a seismic cable. When the cable is placed on the ground, a vertical motion will cause the piezoelectric material to be distorted because the effect of the reaction mass of the mercury relative to the ground motion distorts the piezoelectric material. The location of the liquid in the cylinder permits a response to only the vertical component of motion and provides for cancellation of other effects of motion on the detector.

BRIEF DESCRIPTION OF THE DRAWINGS

Further objects and features of the invention will be apparent from the following description taken in connection with the accompanying drawing in which.

DESCRIPTION OF PREFERRED EMBODIMENTS

Figure 1:
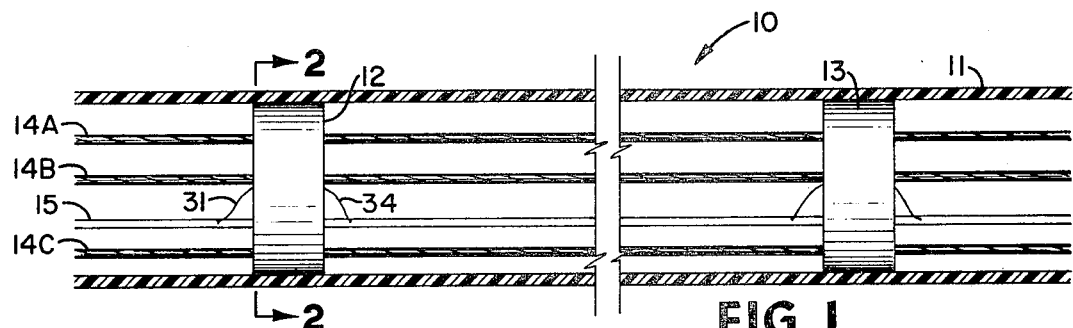
FIG. 1 is a view of a seismic cable in cross-section along its length.

In FIG. 1, a portion of seismic cable 10 is illustrated as comprised of a flexible tubular outer sheath 11 which encloses spaced-apart, bulkhead supports 12, 13. In acutal construction, the cable has detectors disposed along its length and groups of detectors are coupled in parallel or series-parallel for detecting ground motion. Supports 12 and 13, which are typical, are constructed from a rigid material, such as a suitable plastic, and carry a seismic detector of the type that is provided by the present invention. Load supporting cables 14a, 14b and 14c extend along the length of the cable and provide the strength capacity for retaining the integrity of the cable. A bundle of twisted electrical wire pairs 15 also extends along the length of the cable and provides for electrical connection to each seismic detector.

Figure 2:
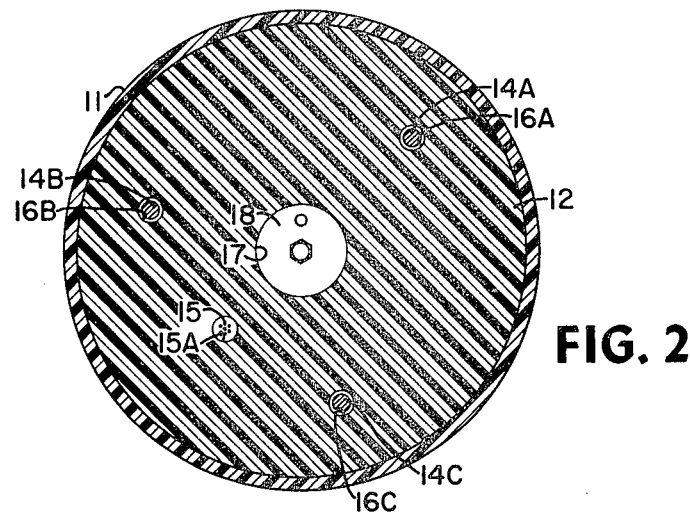
FIG. 2 is a view in cross-section taken along line 2—2 of FIG. 1.

As illustrated in FIG. 2, a typical bulkhead 12 has a solid cylindrically shaped cross-section. Lengthwise openings 16a, 16b and 16c extend through a bulkhead and are respectively provided for cables 14a, 14b, and 14c. A lengthwise opening 15a is also provided for the electrical wire bundle 15. The bulkhead 12 is provided with a central bore 17 along its central axis which snugly receives a cylindrically shaped detector 18. Detector 18 is glued or otherwise fixed into rigid attachment with the bulkhead 12. The bulkhead 12 is inserted into the outer sheath 11 when the outer sheath is slightly inflated by gas pressure so that upon release of the gas pressure the sheath 11 tightly fixes to the bulkhead 12. The foregoing construction and arrangement, as described, permits ground motions to be transmitted to the detector without substantial absorption or attenuation by the supporting medium.

Figure 3:
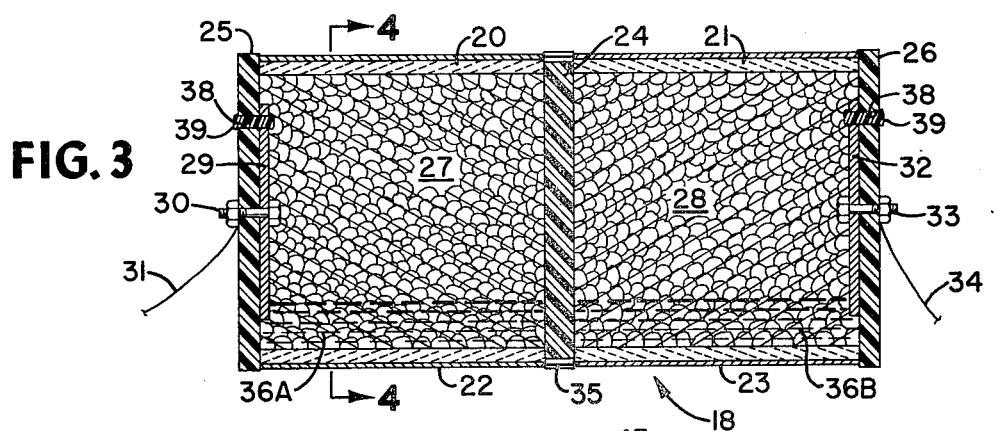
FIG. 3 is a view in lengthwise cross-section of a detector embodying the present invention.

As shown in FIG. 3, detector 18 includes two axially aligned, piezoelectric tubular members 20 and 21. Member 20 is polarized so that current flow is in a radially outward direction while member 21 is polarized so that current flow is in a radially inward direction. Before proceeding into further discussion of the invention, it may be helpful to explain that polarization of members 20 and 21 is obtained by initially polarizing piezoelectric tubular elements having inner and outer metal coatings with a high voltage potential applied to the inner and outer metallic coatings.

The elements 20 and 21, however, only have an outer metallic coating 22 and 23 of silver. This arrangement is obtained by taking a polarized element, as described above, and coating the polarized element with wax except for the inner metal surface. Nitric acid is then used to dissolve the inner metal coating. When the wax is next removed, there is left a polarized element 20 or 21 having only an outer metal coating.

Between the elemtns 20 and 21 is a cylindrical, electrically nonconductive disc 24 and at the remaining ends of elements 20 and 21 are electrically nonconductive discs 25 and 26. The diameter of discs 25, 26 is the same or slightly larger than the diameter of the silver coated elements 20 and 21. The discs are hermetically sealed relative to the tubular elements so that each element has an enclosure or chamber. Within the chamber of each element 20 and 21 are porous cellular masses 27 and 28 which fill the volume of their respective chambers.

On the inner surface of disc 25 is a centered, cylindrically shaped electrode plate 29 of stainless steel. Plate 29 has an outer periphery equidistantly spaced from the inner wall surface of the element 20. A stainless steel bolt 30 extends through the disc 25 and attaches the plate 29 to an electrical conductor 31. Similarly, on the inner surface of disc 26 is a centered, cylindrically shaped plate 32 of stainless steel. Plate 32 has an outer periphery equidistantly spaced from the inner wall surface of the element 21. A stainless steel bolt 33 extends through the disc 26 and attaches the plate 32 to an electrical conductor 34.

Figure 4:
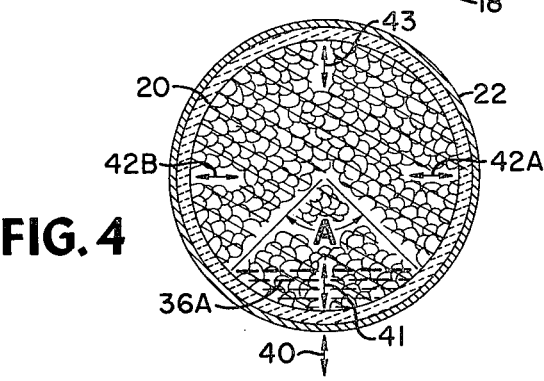
FIG. 4 is a view in cross-section taken along line 4—4 of FIG. 3.

The outer silver surfaces 22 and 23 are electrically interconnected at radially disposed locations 35. Disposed within the chambers of elements 20 and 21 are quantities of mercury 36a and 36b which are measured so as to fill only a bottom segment portion of each element. As illustrated in FIG. 4, in a level position, mercury 36a preferably should fill a volume of the element defined within a sector angle "A" of 90°. As shown in FIG. 3, the level of the mercury is above the gap between the plate 29 and element 20 so that the mercury is in contact with plate 29. Hence, beginning with the electrical lead 31, there is an electrical circuit provided by the bolt 30, plate 29, mercury 36a, element 20, coating 22, connector 35, coating 23, element 21, mercury 36b, plate 32, bolt 33 and electrical lead 34. Bolts 30, 33 and plates 29 and 32 are constructed of stainless steel to avoid dissolution by the mercury.

To fill the chambers of the elements with mercury, each end wall is provided with an opening 38 which is normally closed by a silastic or other self-sealing material 39. A hypodermic needle can be inserted through the material 39 to inject the proper or desired amount of mercury into the element. Upon withdrawal of the needle, the material is self-sealing so that the mercury is enclosed within an element.

As illustrated in FIG. 4, a ground motion 40 is resisted by the mass of the mercury 36a so that a distortion (illustrated by arrow 41) is produced on the lower segment of the element 20. An effect of lateral motion (illustrated by arrows 42a, 42b) is cancelled out and the effect at the top of the cylinder (illustrated by the arrow 43) is not included in the electrical path. Thus, the vertical motion only is detected by use of a mercury mass in a lower quadrant of the cylinders. Distortion of the piezoelectric material produces a potential signal across the leads 31 and 34. Because of the opposite polarization of elements 20 and 21, external electrical effects are cancelled out and do not induce any noise signal to the circuit.

It will be appreciated that the mercury is self-aligning to the vertical, irrespective of rotation of a detector about its axis of symmetry. The foam filler is sufficiently porous to permit the free flow of mercury yet prevents splashing of the mercury in response to movement and quickly settles the upper surface of the mercury if the detector is moved. A less preferable anti-splash device would be a plate member floating on the surface. Changes in the angle of inclination of the axis of symmetry relative to the horizontal plane do not materially affect the sensitivity since the average amount of reaction mass over the element is nearly constant, that is, there is increased mass at one end which compensates for decreased mass at the opposite end. While mercury has a freezing point of −38.9°F., this can be lowered by dissolving appropriate amounts of lead or tin into the mercury.

The opposite electrical poling of elements 20 and 21 and interconnection of the outer plates 22 and 23 provide a balanced electrical output. By controlling the proportioning of mercury, and the diameter of each plate, for a given size, the unit can be made to electrically disconnect when the angle of inclination exceeds a given predetermined angle.

The detector will also perform in a vertical mode if the electrical connections are appropriately changed so that electrical continuity is present with the mercury covering the inner end plate. Because of the symmetry, the detector is self-orienting and responsive to vertical motion. The symmetry also provides a benefit in that some displacement of the mercury from a level condition does not affect the output because of a compensating effect.

With the foregoing described arrangement, it will be appreciated that a detector is provided which can be incorporated into a cable and can be towed over land surfaces and handled without "undue care" since there are no moving or mechanical parts which are subject to breakage or a malfunction. At the same time, this detector permits the use of a cable in extremely low temperature climatic conditions without concern for decreased sensitivity.

While particular embodiments of the present invention have been shown and described, it is apparent that changes and modifications may be made without departing from this invention in its broader aspects; and, therefore, the aim in the appended claims is to cover all such changes and modifications as fall within the true spirit and scope of this invention.

I claim:

1. A seismic detector comprising:
   a tubular element constructed of piezoelectric material,
   end pieces for hermetically enclosing the interior of said tubular element, said end pieces being constructed of electrically nonconductive material,
   metal plate electrode means disposed on the interior one of said end pieces, said plate electrode means being sized to be equidistantly spaced from the interior wall of said tubular element,
   electrode means attached to the outer surface of said tubular element,
   mercury in said tubular member in an amount less than one-half of the volume of said tubular member for coupling said piezoelectric element to said metal plate member, and
   output conductors coupled to said electrode means.

2. The detector of claim 1 and further including means in the interior of said tubular member for inhibiting splash of said mercury.

3. The detector of claim 2 wherein said splash inhibiting means is an open cell foam which fills the interior of said tubular member.

4. The detector of claim 2 wherein said mercury has a dissolved metallic element therein for lowering the freezing point of the mercury solution.

5. A seismic detector comprising:
   first and second axially aligned tubular elements respectively constructed of piezoelectric material and having an outer metallic coating,
   a central separating wall and end walls for hermetically sealing off the interior of said tubular elements and defining first and second enclosed chambers, said walls being constructed of electrically nonconductive material,
   circular shaped plate members disposed on the interior surface of said end walls and having a peripheral spacing with respect to said tubular elements,
   mercury in said tubular members in an amount less than one-half the volume of a tubular member for coupling said piezoelectric element to said metal plate member,
   means in the interior of said tubular elements for inhibiting splash of said mercury,
   means coupling said outer coatings to one another, and
   output conductor means coupled to said plate members.

6. The detector of claim 5 and further including means defining an opening to said tubular members, and a self-sealing substance plugging said opening.

7. The detector of claim 5 wherein said plate members are made of stainless steel material and are attached to said end walls by bolts made of stainless steel material.

8. The detector of claim 5, wherein the amount of mercury in said tubular members is contained within a segment of a tubular member defined by a sector angle of 90°.

9. The detector of claim 5 wherein said tubular elements are respectively electrically polarized in opposing radial directions.

10. A sub-assembly for a seismic detector comprising a cylindrical, electrically nonconductive housing having a central bore,
    a seismic detector snugly receivein said central bore,
    said seismic detector being comprised of
    first and second axially algined tubular elements respectively constructed of piezoelectric material and having an outer metallic coating,
    a central separating wall and end walls for hermetically sealing off the interior of said tubular elements and defining first and second enclosed chambers, said walls being constructed of electrically nonconductive material,
    circular shaped plate members disposed on the interior surfaces of said end walls and having a peripheral spacing with respect to said tubular elements,
    mercury in said tubular members in an amount less than one-half the volume of a tubular member for coupling said piezoelectric element to said metal plate member,
    means in the interior of said tubular elements for inhibiting splash of said mercury,
    means coupling said outer coatings to one another, and
    output conductor means coupled to said plate members.

11. A seismic cable for surface exploration comprising an elongated supporting cable means having strength carrying members and seismic bulkhead supports disposed along its length,
    at least some of said bulkheads having a cylindrical electrically nonconductive housing having a central bore and being disposed in intimate contact relationship with respect to the cable portion around said bulkhead,
    seismic detectors snugly-received in said central bores, said seismic detectors being comprised of
    first and second axially aligned tubular elements respectively constructed of piezoelectric material and having an outer metallic coating,
    a central separating wall and end walls for hermetically sealing off the interior of said tubular elements and defining first and second enclosed chambers, said walls being constructed of electrically nonconductive material,
    circular shaped plate members disposed on the interior surfaces of said end walls and having a peripheral spacing with respect to said tubular elements,
    mercury in said tubular members in an amount less than one-half the volume of a tubular member for coupling said piezoelectric element to said metal plate member,
    means in the interior of said tubular elements for inhibiting splash of said mercury,
    means coupling said outer coatings to one another, and
    output conductor means coupled to said plate members.

* * * * *